United States Patent [19]

Bodlaj

[11] 3,923,395
[45] Dec. 2, 1975

[54] PROCESS FOR MEASURING THE DISTANCE OF AND THE SPEED COMPONENT OF AN OBJECT PERPENDICULAR TO A REFERENCE LINE

[75] Inventor: Viktor Bodlaj, Munich, Germany

[73] Assignee: Siemens Aktiengesellschaft, Berlin & Munich, Germany

[22] Filed: May 15, 1974

[21] Appl. No.: 470,154

[30] Foreign Application Priority Data
May 17, 1973 Germany.......................... 2325086

[52] U.S. Cl. ........................ 356/4; 356/1; 356/141; 356/152
[51] Int. Cl.² ...................... G01C 3/00; G01C 3/08
[58] Field of Search ................. 356/1, 4, 5, 141, 152

[56] References Cited
UNITED STATES PATENTS
2,968,987  1/1961  Knopow................................. 356/5
3,442,570  5/1969  Picker.................................. 350/161
3,692,414  9/1972  Hosterman et al. ..................... 356/4

Primary Examiner—Maynard R. Wilbur
Assistant Examiner—S. C. Buczinski
Attorney, Agent, or Firm—Hill, Gross, Simpson, Van Santen, Steadman, Chiara & Simpson

[57] ABSTRACT

A process for rapid measurement of the distance of an object from the reference plane and the speed component of an object perpendicular to the reference plane in which laser beams are transmitted from a transmitter and periodically deflected by a beam deflector over the area of space in which the object is located. The beams are reflected in diffused fashion on the object and are registered by a detector arranged next to the transmitter. The detector can only receive light from a specific direction, and the distances are determined by the difference in time between the initiation of beam deflection and the detector signal. The beam deflector is operated by a generator with a sinusoidal voltage matched in frequency to the natural mechanical resonant frequency and only the approximately linear section of the sinusoidal voltage is used for measuring purposes.

9 Claims, 4 Drawing Figures

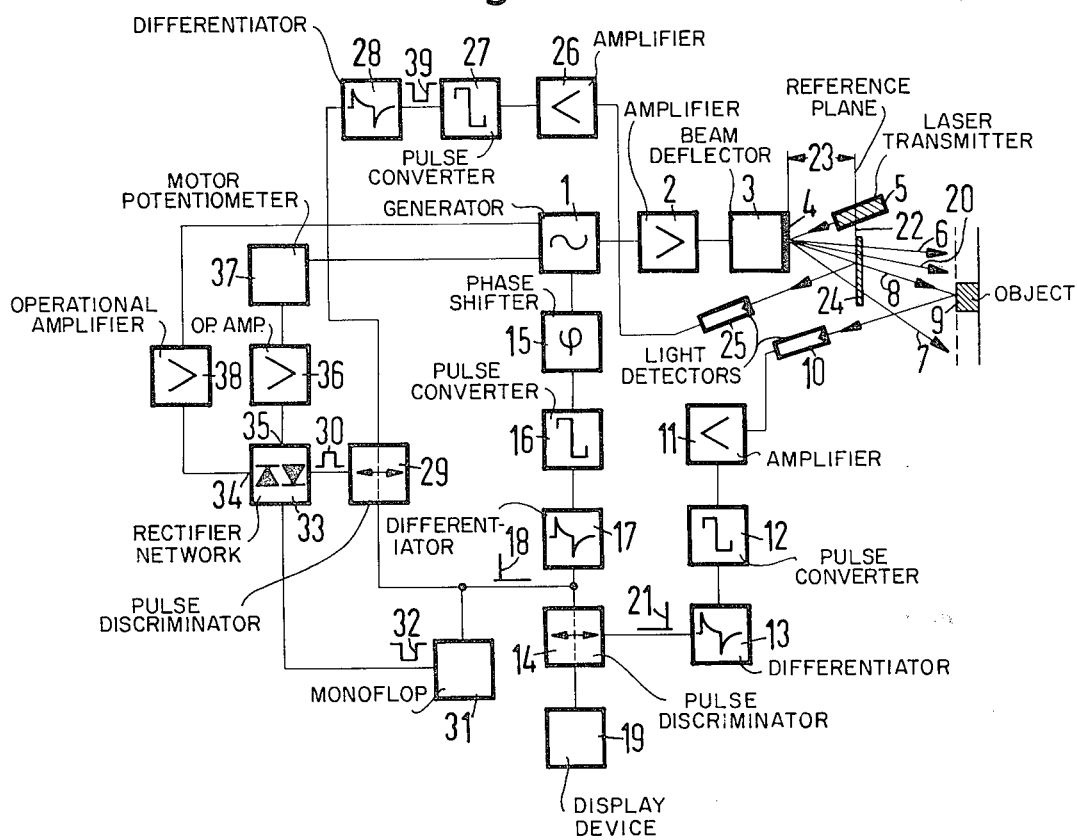

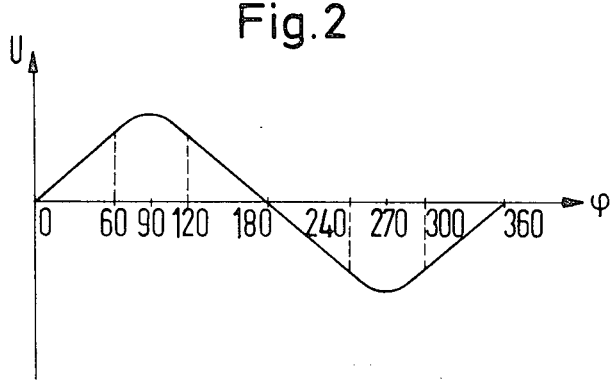
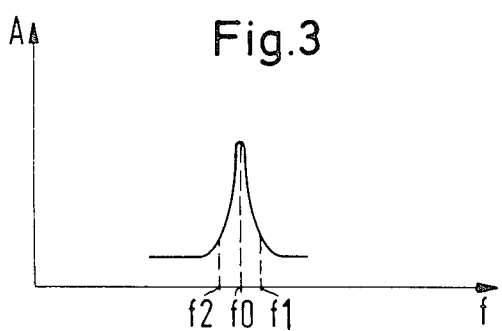
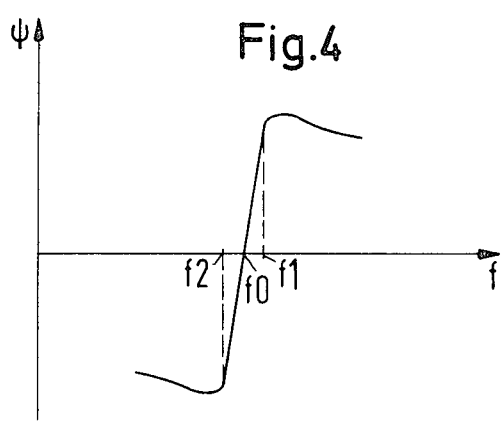

PROCESS FOR MEASURING THE DISTANCE OF AND THE SPEED COMPONENT OF AN OBJECT PERPENDICULAR TO A REFERENCE LINE

BACKGROUND OF THE INVENTION

1. Field of the Invention

This invention relates to a process for rapid measurement of the distance of an object from a reference plane and the speed component of the object perpendicular to the reference plane wherein laser beams are transmitted from a transmitter and periodically deflected by a beam deflector over the area of space in which the object is located and are reflected on the object in diffused fashion and recorded by a detector arranged next to the transmitter. The detector can only receive light from a specific direction and distance and distance is determined from the difference in time between the initiation of beam deflection and the detector signal.

2. Description of the Prior Art

In my prior application, Ser. No. 367,414, filed June 6, 1973, I proposed a process for rapid range measurement of an object from a reference plane and the speed component of the object perpendicular to the reference plane, in which a piezo-electric beam deflector is operated with a triangular or saw-tooth shaped voltage which is produced by a generator for rectangular wave form voltage pulses. The measurement value is determined by the difference in time between the commencement of the beam deflection and the detector signal.

In an arrangement of this type, high demands are made on the control of the deflecting device if large oscillation amplitudes of the oscillating reflectors contained in the deflecting device are to be attained and stabilized over long periods of time.

SUMMARY OF THE INVENTION

The primary object of the invention is to modify the process taught in my aforementioned copending application in such a manner that a simple control of the beam deflector and stabilization of the commencement of the measurement, and thus a high degree of measuring accuracy are achieved.

This object is realized in accordance with the invention in that the beam deflector is operated by a generator with a sinusoidal voltage which is matched in terms of frequency to the natural resonances of the mechanical construction, wherein only the approximately linear part of the sinusoidal voltage is used for measurement purposes.

An oscillating reflector driven with a sinusoidal voltage may be excited with a low power supply to execute oscillations with large amplitudes. The pick-up power possesses a minimum when the operating frequency is the same as the resonant frequency of the mechanical oscillating system.

The laser beams which are diffused on the object which is to be measured are registered by a detector. The measuring pulses, which here are produced in a measuring circuit, and likewise the sinusoidal voltage, which in a reference circuit produces reference pulses, are converted, in particular into rectangular pulses, in order to achieve a high degree of measuring accuracy. The rectangular pulses which are thus formed are subsequently converted into sharp needle pulses by means of differentiation and suppression of the negative pulses produced at the trailing edge, and are finally conducted to a pulse discriminator to which is connected an electronic display device.

As the oscillation of the oscillating reflectors is sinusoidal, the oscillating reflectors execute a nonlinear movement, as a result of which it would be necessary to take into account a trigonometrical dependence of the distances of the objects upon the measuring times. To avoid this, advantageously the reversal zones of the reflector oscillations which are slowly passed through are excluded from measurement. To this end, in particular the reference pulses are produced by a phase shift device, which device is connected to the generator, in adjustable fashion and only when the reversal zones of the reflector positions have been passed through. For the measurement of thickness, distance and speed, one uses only the oscillation range in which the reflector oscillation has an approximately linear course. The gauge, e.g. for the distance of an object, is then obtained from the difference in time between the commencement of the linear reflector oscillation and the time of the production of the measuring pulses which are formed in the detector.

In order to stabilize the phase of the sinusoidal voltage which operates the oscillating reflectors and/or the amplitude and phase of the reflector oscillation, advantageously the frequency of the sinusoidal voltage produced by the generator is automatically adjusted by a correcting voltage if, as a result of mechanical or thermal influences, either during or outside the operating time of the measuring device, the frequency of the sinusoidal voltage should differ from the resonant frequency of the beam deflector.

These changes can occur both in the beam deflector and in the electronic analysis device.

Therefore, an electronic stabilization device enables absolute value measurements over long periods of time.

BRIEF DESCRIPTION OF THE DRAWING

Other objects, features and advantages of the invention, together with its organization, construction and operation will be best understood from the following detailed description of an exemplary embodiment thereof taken in conjunction with the accompanying drawings, on which:

FIG. 1 is a schematic block diagram of a stabilized arrangement for measuring distances;

FIG. 2 is a graphical illustration of the measurement range of the reflector oscillation;

FIG. 3 is a graphical illustration of the amplitude of the reflector oscillation; and FIG. 4 is a graphical illustration representing the phase between a sinusoidal voltage and the reflector oscillation.

DESCRIPTION OF THE PREFERRED EMBODIMENT

Referring first to FIG. 1, a process for distance measurement will be described by way of an exemplary embodiment. A sinusoidal generator 1 produces sinusoidal voltages which are amplified in an amplifier 2 and conducted to a beam deflector 3 to operate the oscillating reflector 4 contained therein. The frequency of the alternating voltage produced by the generator 1 is in accordance with the resonant frequency of the oscillating reflector 4 and can amount to a few kHz. On the oscillator 4, laser beams emanating from a laser transmitter 5 are conducted back and forth within an angular range between the reverse directions 6 and 7. At the time at which the oscillating reflector 4 is in a position in which the deflected laser beam 8 is diffused on the object 9 to be measured and is received by the detector 10, measuring signals are triggered in the detector. These signals are amplified in an amplifier 11 and conducted to a pulse converter 12 which forms a rectangular wave form voltage from the signal. The rectangular pulses which are formed then pass to a differentiator 13 which conducts only the rising edge of the rectangular pulses, as a measuring pulse 21, to a pulse discriminator 14.

The alternating voltage produced by the sinusoidal generator 1 is modified in phase by a predetermined amount in a reference circuit in a phase shift device 15, for a purpose which will be explained below, and passes into a converter 16 which forms a rectangular voltage from the sinusoidal alternating voltage. Of the rectangular pulses which are thus produced, only the differentiated rising edges of the rectangular pulses are, in a following differentiator 17, passed as first reference pulses 18 to the pulse discriminator 14. The pulse discriminator 14 produces pulses whose length correspond to the difference in time between a first reference pulse 18 and a measuring pulse 21. These pulses provide a gauge for the distance $d$ of the object 9 from the zero plane and are conducted to an electronic display device 19.

In order to measure the speed component of the object 9 perpendicular to the reference plane 22, the above mentioned distance is measured at the time $t_1$ and $t_2$ and the difference in the distance is electronically divided by $(t_2 - t_1)$.

The measuring process will be explained in further detail with the aid of FIG. 2. The oscillating reflector 4 features the sinusoidal movement sequence illustrated in FIG. 2. The reversal directions of the deflected laser beams 6, 7 corresponds to the phase of the sinusoidal curve of 90° and 270°. In the vicinity of these reversal directions, the oscillatory movement is zero or slow in comparison to the oscillatory movement between 120° and 240°. Between these two values the speed of deflection is approximately constant. Therefore, only the movement sequence between 120° and 240° of the phase of the sinusoidal curve is used for measurement purposes. The reflector position which corresponds to a phase angle of 120°, produces a deflection of the beam in the direction 20. The phase shift device 15 changes the phase of the alternating voltage emanating from the generator 1 in a reference circuit by 30°.Therefore, the reference pulse 18 is produced at a time at which the laser beam is beamed deflective in the direction 20. At the later point of time at which the laser beam is being deflected in the direction 8, the measuring pulse 21 is formed. When the measuring device has been calibrated it is therefore possible to determine the distance of the object 9 from the measuring device from the difference in time between the occurrence of the pulses 18 and 21.

In accordance with FIG. 1, to provide a stabilization of the phase of the sinusoidal voltage which operates the oscillating reflectors, and/or of the amplitude and phase of the reflector oscillation, a permeable plate 24 is arranged in the reference plane 22 at a predetermined distance 23 from the oscillating reflector 4. On its upper side, which is always slightly reflective, the laser beam which is reflected on the oscillating reflector 4 is conducted to a reference detector 25 the associated position of the oscillating reflector being determined by the positions of the oscillating reflector 4, plate 24 and the reference detector 25. This position of the oscillating reflector occurs at a time $t_{Bezug}$. The reference signal which is produced in the reference detector 25 is amplified in an amplifier 26, converted in the converter 27 into a rectangular pulse and the rising edge of the rectangular pulse differentiated in the differentiator 28 is conducted, as a second reference pulse 39, to a pulse discriminator 29 at the time $t_{Bezug}$. Shortly before hand, i.e. at the time $t_{Ref}$ it is supplied with the first reference pulse 18 formed in the reference circuit. Therefore, in the pulse discriminator 29 there is formed a first comparison pulse 30 having a length which is proportional to the difference in the times of occurrence ($t_{Bezug} - t_{Ref}$) and which may be adjusted via the distance 23 between the plate 24 and the oscillating reflector 4.

The first reference pulse 18 is, on the other hand, conducted to a monostable flip-flop element 31 which produces standard second comparison pulses 32 which have a set, but adjustable, pulse length.

The standard second comparison pulses 32 and the first comparison pulses 30 finally pass simultaneously into a rectifier network 33 which can supply, via two outputs 34 and 35, a positive or negative correcting voltage, when the comparison pulses 30 are longer or shorter than the standard second comparison pulses 32. When the first comparison pulses and standard second comparison pulses are of equal length, this correcting voltage disappears.

Before the commencement of a distance or speed measurement, the distance 23 is said to be such that the first comparison pulses 30 which are formed to have the same length as the standard second comparison pulses 32 and that the correcting voltage is zero at the outputs 34 and 35 of the rectifier network.

If, during the course of time, external influences cause a change in the frequency of the sinusoidal voltage in the generator 1, or in the phase of the amplifier 2, the phase shift device 15, the converter 16 or the differentiator 17, or in the resonant frequency or resonant amplitude in the beam deflector 3, the length of the first comparison pulses 30 will also in fact change in relation to that of the standard second comparison pulses 32 and a positive or negative voltage will be formed at the outputs 34 and 35 of the rectifier network 33.

For purposes of rough correction, this correcting voltage obtained from the output 35 is conducted, via an operational amplifier 36, to a motor potentiometer 37, in order to modify the frequency of the sinusoidal voltage produced by the generator 1. As a result of this modification, the oscillatory movement of the oscillating reflector 4 is adjusted until the first comparison pulses 30 are again the same length as the standard second comparison pulses 32.

For fine correction, the correcting voltage which is formed at the output 34 is amplified in the operational amplifier 38 and fed to the generator 1 (RC oscillator). With a field effect transistor connected as a controllable resistor in the event of very slight deviations both in the phase between the sinusoidal voltage and the oscillation of the oscillating reflector 4, and also in the amplitude of the oscillation of the oscillating reflector 4, as a result of a positive or negative correcting voltage, the frequency in the generator 1 is increased or reduced.

The phase $\psi$ and the amplitude A of the oscillation of the oscillating reflector 4 does in fact change very considerably with the operating frequency in the vicinity of the resonant frequency of the oscillating reflector, as illustrated in FIGS. 3 and 4 in which $f_0$ is the resonant frequency of the oscillating reflector 4.

The frequency of the generator 1 is set by way of the output 35, an operational amplifier 36 and a motor potentiometer 37 in such a manner that the first comparison pulse length 30 corresponds approximately to the standard second comparison pulse length 32 (rough setting). The output 34 sets the first comparison pulse precisely to the length of the standard second comparison pulse 32, by way of an operational amplifier 38.

As the amplitude and phase of the oscillating reflector is very considerably dependent upon the control frequency in the vicinity of the resonant frequency (see FIGS. 3 and 4), it is possible to achieve a very accurate correction of the first comparison pulse 30 and therefore a stabilization of the commencement of the measurement.

The stabilization circuit can also be used in similar processes for measuring the thickness of objects.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim

1. In a method for rapidly measuring the distance of a moving object from a datum plane and the velocity components of the object perpendicular to the datum plane in which laser beams are transmitted into the spacing which the object is located and periodically scanned through the space with a deflector and in which diffusely reflected light from the object is received with a detector mounted next to the transmitter and capable of receiving light only from a specific direction, and in which the distances are determined from the differences in time between initiation of deflection and the occurrences of measuring signals produced by the detector, the improvement comprising the steps of:

applying a sinusoidal voltage to the deflector having a linear section and a frequency matched to the natural mechanical resonant frequency of the deflector;

generating first reference pulses during the linear section of the sinusoidal voltage;

producing measuring pulses from the measuring signal; measuring the time between a first reference pulse and a measuring pulse to produce a distance pulse having a pulse length corresponding to the distance of the object from the datum plane;

generating second reference pulses at times corresponding to a predetermined position of the deflector;

measuring the times between first and second reference pulses to produce first comparison pulses;

deriving second comparison pulses from said first reference pulses; and comparing the first and second comparison pulses and controlling the frequency of the sinusoidal voltage in accordance with the length of the longer of said first and second comparison pulses and the difference in width between said first and second comparison pulses.

2. The method of claim 1, comprising the step of shifting the phase of the first reference pulses by an amount whereat the corresponding sinusoidal voltage has energized the deflector past the reversal zones of oscillation.

3. Apparatus for measuring the range of an object relative to a datum plane, comprising: laser beam scanning means including a beam deflector for periodically scanning a laser beam through a space in which the object is located; a laser energy detector adjacent said scanning means for detecting reflected energy from a specific direction and producing measuring pulses; generator means connected to said deflector and generating a sinusoidal signal having a linear portion and a frequency matched to the mechanical resonant frequency of said deflector; a reference circuit connected to said generator means for producing reference pulses during the linear portion of the sinusoidal voltage; and range determining means connected to said detector and to said reference circuit to measure the time between the commencement of a reference pulse and that of a measuring pulse.

4. The apparatus of claim 3, wherein said range determining means comprises: first and second converting means connected to said reference circuit and to said detector, respectively, for converting said reference and measuring pulses to respective rectangular reference and measuring pulses; first and second differentiation means connected to said first and second converting means, respectively, for differentiating the rectangular pulses and suppressing the differentiation product effected by the trailing edges of the rectangular pulses; and display means connected to said first and second differentiation means for displaying the time differences between differentiation products effected by the leading edges of the rectangular reference and measuring pulses as the distance of the object.

5. The apparatus of claim 4, comprising: a phase shift circuit connected between said generator means and said reference circuit to shift the phase of the voltage applied to said reference circuit so that said reference pulses are produced during the approximately linear portion of the oscillation of said deflector.

6. The apparatus of claim 4, comprising: a monostable circuit connected to said first differentiation means and responsive to the leading edge differentiation product to generate a standard pulse; reference means including an additional detector; a reflector spaced a predetermined distance from said beam deflector to reflect a laser beam toward said additional detector, said additional detector responsive to generate an additional pulse; third converting means connected to said additional detector to convert said additional pulse to a rectangular pulse; third differentiation means connected to said third converting means for differentiating the rectangular additional pulse and suppressing the differentiation product effected by the trailing edge of the rectangular pulse; comparison means connected to said first and third differentiation means for producing a comparison pulse having a length which is proportional to the difference between the initiation of a reference pulse and said additional pulse; and adjustment means connected between said comparison means and said generating means for producing a correcting voltage in accordance with the difference between the pulse length of the comparison and standard pulses for correcting the frequency of the generated alternating voltage.

7. The apparatus of claim 6, wherein said adjustment means comprises a motor potentiometer connected to said generator means for effecting a course adjustment.

8. The apparatus of claim 6, wherein said adjustment means comprises an operational amplifier connected to said generator means for effecting a fine adjustment of the output frequency to the resonant frequency of said deflector.

9. In a method for rapidly measuring the distance of a moving object from a datum plane and the velocity components of the object perpendicular to the datum plane in which laser beams are transmitted into the space in which the object is located and periodically scanned through the space with a deflector and wherein diffusely deflected light from the object is received with a detector mounted next to the transmitter and capable of receiving light only from a specific direction, and in which distances are determined from the differences in time between initiation of deflection and the occurrences of measuring signals produced by the detector, the improvement comprising the steps of:

applying a sinusoidal voltage to the deflector having a linear section and a frequency matched to the natural mechanical resonant frequency of the deflector;

generating first reference pulses during linear sections of the sinusoidal voltage;

producing measuring pulses from the measuring signal; measuring the time between a reference pulse and a measuring pulse to produce a distance pulse having a pulse length corresponding to the distance of the object from the datum plane; and comparing the wave of the sinusoidal voltage with the wave of sinusoidal scanning of the deflector to control the frequency of the sinusoidal voltage.

* * * * *